US012762968B2

(12) United States Patent
Baladhandapani et al.

(10) Patent No.: US 12,762,968 B2
(45) Date of Patent: Oct. 13, 2026

(54) SYSTEMS AND METHODS FOR GENERATING PREDICTED OPERATIONAL PARAMETERS ASSOCIATED WITH AN AIRPORT

(71) Applicant: HONEYWELL INTERNATIONAL INC., Charlotte, NC (US)

(72) Inventors: Gobinathan Baladhandapani, Madurai (IN); Sivakumar Kanagarajan, Bangalore (IN); Muthusankar Subramaniyan, Brno (CZ); Karthikeyan M, Madurai (IN)

(73) Assignee: Honeywell Aerospace US LLC, Phoenix, AZ (US)

( * ) Notice: Subject to any disclaimer, the term of this patent is extended or adjusted under 35 U.S.C. 154(b) by 5 days.

(21) Appl. No.: 18/968,213

(22) Filed: Dec. 4, 2024

(65) Prior Publication Data

US 2026/0112278 A1 Apr. 23, 2026

(30) Foreign Application Priority Data

Oct. 18, 2024 (IN) ............................ 202411079271

(51) Int. Cl.
*G08G 5/55* (2025.01)
*G08G 5/22* (2025.01)
*G08G 5/26* (2025.01)

(52) U.S. Cl.
CPC ................ *G08G 5/55* (2025.01); *G08G 5/22* (2025.01); *G08G 5/26* (2025.01)

(58) Field of Classification Search
CPC .............. G08G 5/55; G08G 5/22; G08G 5/26
See application file for complete search history.

(56) References Cited

U.S. PATENT DOCUMENTS 5,265,023 A 11/1993 Sokkappa
5,526,265 A 6/1996 Nakhla
5,842,142 A 11/1998 Murray et al.
(Continued)

FOREIGN PATENT DOCUMENTS

EP 2077439 A2 7/2009
EP 3205980 A1 8/2017
WO 01/46886 A2 6/2001

*Primary Examiner* — Donald J Wallace
*Assistant Examiner* — Jalal C Coduroglu
(74) *Attorney, Agent, or Firm* — Ingrassia Fisher & Lorenz

(57) ABSTRACT

Systems and methods are provided for generating predicted operational parameters associated with an airport. Controller pilot data link communication (CPDLC) messages between a CPDLC system and a first plurality of aircraft at an airport are received. Air traffic control (ATC) messages between ATC and a second plurality of aircraft at the airport are received. A training dataset associated with at least one operational parameter is generated based on the CPDLC messages and the ATC messages. An airport operational model associated with the airport is trained using the training dataset. A request for at least one predicted operational parameter associated with the airport is received from a first aircraft. At least one predicted operational parameter is generated using the airport operational model and transmitted to the first aircraft. The at least one predicted operational parameter corresponding to one of the at least one operational parameter.

17 Claims, 6 Drawing Sheets

(56) References Cited

U.S. PATENT DOCUMENTS

| | | | | |
|---|---|---|---|---|
| 8,019,529 | B1 * | 9/2011 | Sharma | G08G 5/51 701/117 |
| 8,565,944 | B1 | 10/2013 | Gershzohn | |
| 8,666,649 | B2 | 3/2014 | Otto et al. | |
| 8,676,481 | B2 | 3/2014 | Coulmeau et al. | |
| 9,076,327 | B1 | 7/2015 | Baiada et al. | |
| 2007/0078591 | A1 * | 4/2007 | Meunier | G05D 1/0083 701/120 |
| 2013/0027226 | A1 * | 1/2013 | Cabos | G08G 5/26 340/961 |
| 2016/0240090 | A1 | 8/2016 | Marcella et al. | |
| 2018/0061243 | A1 * | 3/2018 | Shloosh | G08G 5/21 |
| 2018/0181125 | A1 * | 6/2018 | Ceccom | G08G 5/57 |
| 2020/0090531 | A1 * | 3/2020 | Baladhandapani | G08G 5/55 |
| 2020/0258405 | A1 * | 8/2020 | Fern | G08G 5/22 |
| 2020/0410875 | A1 * | 12/2020 | Kalyan | G08G 5/56 |
| 2021/0183255 | A1 * | 6/2021 | Van Tulder | G08G 5/22 |
| 2022/0138875 | A1 * | 5/2022 | Beynel | G06Q 10/025 705/7.41 |
| 2022/0180756 | A1 * | 6/2022 | Baladhandapani | G08G 5/53 |
| 2022/0215765 | A1 * | 7/2022 | Gupta | G08G 5/34 |
| 2022/0277201 | A1 * | 9/2022 | Purica | G06N 3/084 |
| 2023/0215431 | A1 * | 7/2023 | Baladhandapani | G08G 5/21 |

* cited by examiner

500

502 Airport – DeerValley (KDVT)

504 Landing Statistics – Current

506

| Cleared To | Hold | Long Final | Final | Short Final | Land | Go Around | Total |
|---|---|---|---|---|---|---|---|
| # Aircraft | 2 | 5 | 3 | 2 | 2 | 1 | 15 |
| Average Time | 8 seconds | 5 minutes | | | 3 minutes | 1 minute 43 seconds | |

508

| Notes | Charlie 07 Taxiway for RWY 07R<br>RNAV RWY 25L – 3 Aircraft<br>RNAV RWY 7R – 3 Aircraft |
|---|---|

When you arrive:

510

15 Arrivals in the next 1 hour
RNAV RWY 25L – 5 Aircraft
RNAV RWY 7R - 3 Aircraft
Expected Clearance to Land – 5 minutes
Expected Taxiway Clearance – 1 minute

FIG. 5

SYSTEMS AND METHODS FOR GENERATING PREDICTED OPERATIONAL PARAMETERS ASSOCIATED WITH AN AIRPORT

CROSS REFERENCE TO RELATED APPLICATION

This application claims priority to India Provisional Patent Application No. 202411079271, filed Oct. 18, 2024, the entire content of which is incorporated by reference herein.

TECHNICAL FIELD

The present invention generally relates to aircraft operations and more particularly relates to systems and methods for generating predicted operational parameters associated with an airport.

BACKGROUND

Pilots of aircraft typically tune the aircraft radio to a designated radio frequency to communicate with air traffic control (ATC) at an airport. Voice conversations between the pilots and ATC play an important role in providing pilots with insight into airport operations, traffic analytics, and situational awareness regarding other aircraft flying in the region. However, the industry is moving towards controller pilot data link communications (CPDLC). CPDLC are one on one digital conversations between a CPDLC system at the airport and a pilot of an aircraft. CPDLC cannot be heard by the pilots of other aircraft in the area. The use of CPDLC may provide a pilot with reduced situational awareness associated with an airport environment compared to the use of ATC communications.

Hence, there is a need for systems and methods for generating predicted operational parameters associated with an airport.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a system for generating predicted operational parameters associated with an airport includes at least one processor and at least one memory communicatively coupled to the at least one processor. The at least one memory includes instructions that upon execution by the at least one processor, cause the at least one processor to: receive controller pilot data link communication (CPDLC) messages between a CPDLC system and a first plurality of aircraft at the airport; receive air traffic control (ATC) messages between ATC and a second plurality of aircraft at the airport; generate a training dataset associated with at least one operational parameter based on the CPDLC messages and the ATC messages; train an airport operational model associated with the airport using the training dataset; receive a request for at least one predicted operational parameter associated with the airport from a first aircraft; generate the at least one predicted operational parameter using the airport operational model, the at least one predicted operational parameter corresponding to one of the at least one operational parameter; and transmit the at least one predicted operational parameter to the first aircraft.

In various embodiments, a method for generating predicted operational parameters associated with an airport includes: receiving controller pilot data link communication (CPDLC) messages between a CPDLC system and a first plurality of aircraft at an airport; receiving air traffic control (ATC) messages between ATC and a second plurality of aircraft at the airport; generating a training dataset associated with at least one operational parameter based on the CPDLC messages and the ATC messages; training an airport operational model associated with the airport using the training dataset; receiving a request for at least one predicted operational parameter associated with the airport from a first aircraft; generating the at least one predicted operational parameter using the airport operational model, the at least one predicted operational parameter corresponding to one of the at least one operational parameter; and transmitting the at least one predicted operational parameter to the first aircraft.

In various embodiments, at least one non-transitory machine-readable storage medium stores instructions executable by at least one processor, the instructions configurable to cause the at least one processor to perform operations comprising: receiving controller pilot data link communication (CPDLC) messages between a CPDLC system and a first plurality of aircraft at an airport; receiving air traffic control (ATC) messages between ATC and a second plurality of aircraft at the airport; generating a training dataset associated with at least one operational parameter based on the CPDLC messages and the ATC messages; training an airport operational model associated with the airport using the training dataset; receiving a request for at least one predicted operational parameter associated with the airport from a first aircraft; generating the at least one predicted operational parameter using the airport operational model, the at least one predicted operational parameter corresponding to one of the at least one operational parameter; and transmitting the at least one predicted operational parameter to the first aircraft.

Furthermore, other desirable features and characteristics of the systems and methods for visualization of automated actions using a holographic agent become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 5 is an exemplary illustration a display including predicted operational parameters associated with a landing flight phase generated by an airport operational parameter prediction system in accordance with at least one embodiment.

DETAILED DESCRIPTION

The following detailed description is merely exemplary in nature. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
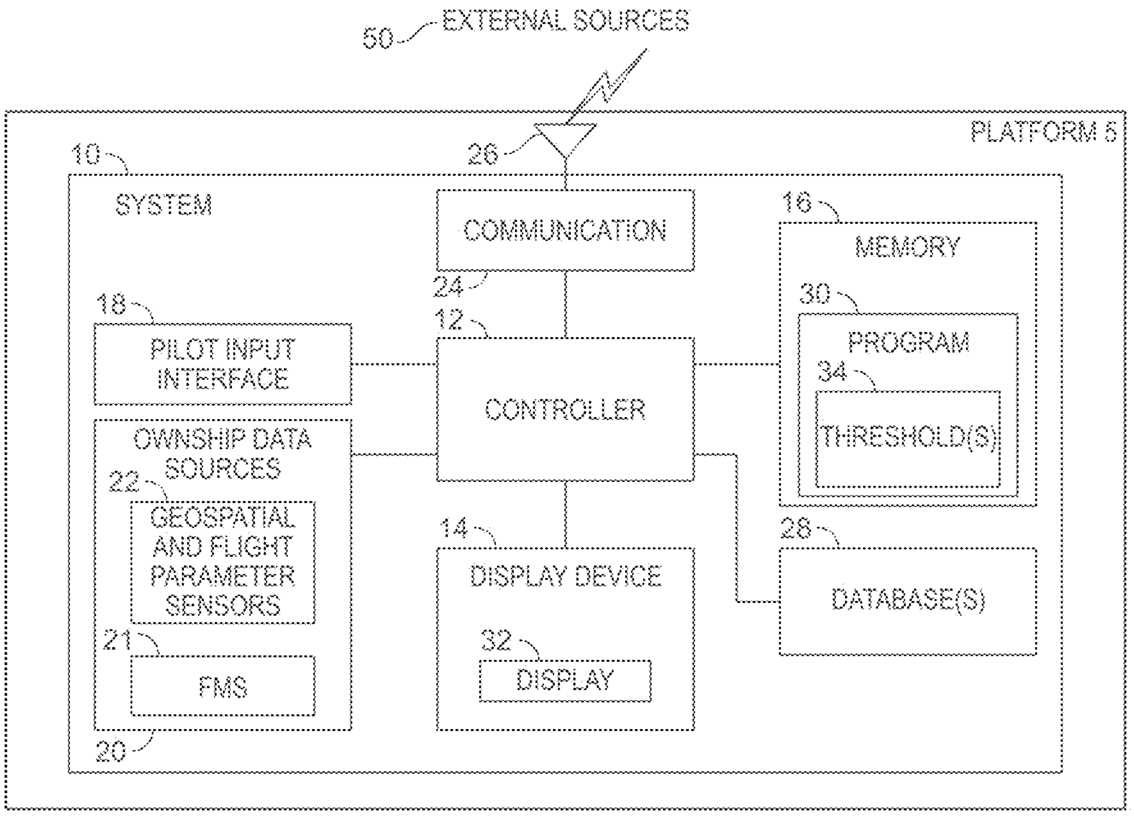
FIG. 1 is a block diagram representation of mobile platform configured to communicate with an airport operational parameter prediction system in accordance with at least one embodiment.

FIG. 1 is a block diagram representation of mobile platform 5 configured to communicate with an airport operational parameter prediction system in accordance with at least one embodiment. The mobile platform 5 includes a system 10. In various embodiments, the mobile platform 5 is an aircraft, which carries or is equipped with the system 10. As schematically depicted in FIG. 1, the system 10 includes the following components or subsystems, each of which may assume the form of a single device or multiple interconnected devices: a controller circuit 12 operationally coupled to: at least one display device 14; computer-readable storage media or memory 16; an optional input interface 18, and ownship data sources 20 including, for example, a flight management system (FMS) 21 and an array of flight system state and geospatial sensors 22.

In various embodiments, the system 10 may be separate from or integrated within: the flight management system (FMS) 21 and/or a flight control system (FCS). Although schematically illustrated in FIG. 1 as a single unit, the individual elements and components of the system 10 can be implemented in a distributed manner utilizing any practical number of physically distinct and operatively interconnected pieces of hardware or equipment. When the system 10 is utilized as described herein, the various components of the system 10 will typically all be located onboard the mobile platform 5.

The term "controller circuit" (and its simplification, "controller"), broadly encompasses those components utilized to carry-out or otherwise support the processing functionalities of the system 10. Accordingly, the controller circuit 12 can encompass or may be associated with a programmable logic array, application specific integrated circuit or other similar firmware, as well as any number of individual processors, flight control computers, navigational equipment pieces, computer-readable memories (including or in addition to the memory 16), power supplies, storage devices, interface cards, and other standardized components.

In various embodiments, the controller circuit 12 embodies one or more processors operationally coupled to data storage having stored therein at least one firmware or software program (generally, computer-readable instructions that embody an algorithm) for carrying-out the various process tasks, calculations, and control/display functions described herein. During operation, the controller circuit 12 may be programmed with and execute the at least one firmware or software program that communicates with the airport operational parameter prediction system in accordance with least one embodiment of a mobile platform 5, where the mobile platform 5 is an aircraft, and to accordingly perform the various process steps, tasks, calculations, and control/display functions described herein.

The controller circuit 12 may exchange data, including real-time wireless data, with one or more external sources 50 to support operation of the system 10 in embodiments. An example of an external source 50 is the airport operational parameter prediction system. Bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

The memory 16 is a data storage that can encompass any number and type of storage media suitable for storing computer-readable code or instructions, such as the aforementioned software program 30, as well as other data generally supporting the operation of the system 10. The memory 16 may also store one or more threshold 34 values, for use by an algorithm embodied in software program 30. One or more database(s) 28 are another form of storage media; they may be integrated with memory 16 or separate from it.

In various embodiments, aircraft-specific parameters and information for an aircraft may be stored in the memory 16 or in a database 28 and referenced by the program 30. Non-limiting examples of aircraft-specific information includes an aircraft weight and dimensions, performance capabilities, configuration options, and the like.

Flight parameter sensors and geospatial sensors 22 supply various types of data or measurements to the controller circuit 12 during an aircraft flight. In various embodiments, the geospatial sensors 22 supply, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data.

With continued reference to FIG. 1, the display device 14 can include any number and type of image generating devices on which one or more avionic displays 32 may be produced. When the system 10 is utilized for a manned aircraft, the display device 14 may be affixed to the static structure of the Aircraft cockpit as, for example, a Head Down Display (HDD) or Head Up Display (HUD) unit. In various embodiments, the display device 14 may assume the form of a movable display device (e.g., a pilot-worn display device) or a portable display device, such as an Electronic Flight Bag (EFB), a laptop, or a tablet computer carried into the aircraft cockpit by a pilot.

At least one avionic display 32 is generated on the display device 14 during operation of the system 10; the term "avionic display" is synonymous with the term "aircraft-related display" and "cockpit display" and encompasses displays generated in textual, graphical, cartographical, and other formats. The system 10 can generate various types of lateral and vertical avionic displays 32 on which map views and symbology, text annunciations, and other graphics pertaining to flight planning are presented for a pilot to view.

The display device 14 is configured to continuously render at least a lateral display showing the aircraft at its current location within the map data. The avionic display 32 generated and controlled by the system 10 can include graphical user interface (GUI) objects and alphanumerical input displays of the type commonly presented on the screens of multifunction control display units (MCDUs), as well as Control Display Units (CDUs) generally. Specifically, embodiments of the avionic displays 32 include one or more two-dimensional (2D) avionic displays, such as a horizontal (i.e., lateral) navigation display or vertical navigation display (i.e., vertical situation display VSD); and/or on one or more three dimensional (3D) avionic displays, such as a Primary Flight Display (PFD) or an exocentric 3D avionic display.

In various embodiments, a human-machine interface is implemented as an integration of a pilot input interface 18 and a display device 14. In various embodiments, the display device 14 is a touch screen display. In various embodiments, the human-machine interface also includes a separate pilot input interface 18 (such as a keyboard, cursor control device, voice input device, or the like), generally operationally coupled to the display device 14. Via various display and graphics systems processes, the controller circuit 12 may command and control a touch screen display device 14 to generate a variety of graphical user interface (GUI) objects or elements described herein, including, for example, buttons, sliders, and the like, which are used to prompt a user to interact with the human-machine interface to provide user input; and for the controller circuit 12 to activate respective functions and provide user feedback, responsive to received user input at the GUI element.

In various embodiments, the system 10 may also include a dedicated communications circuit 24 configured to provide a real-time bidirectional wired and/or wireless data exchange for the controller 12 to communicate with the external sources 50 (including, each of: traffic, air traffic control (ATC), a controller pilot data link communication (CPDLC) system, satellite weather sources, ground stations, and the like).

In various embodiments, the communications circuit 24 may include a public or private network implemented in accordance with Transmission Control Protocol/Internet Protocol architectures and/or other conventional protocol standards. Encryption and mutual authentication techniques may be applied, as appropriate, to ensure data security. In some embodiments, the communications circuit 24 is integrated within the controller circuit 12, and in other embodiments, the communications circuit 24 is external to the controller circuit 12. When the external source 50 is "traffic, " the communications circuit 24 may incorporate software and/or hardware for communication protocols as needed for traffic collision avoidance (TCAS), automatic dependent surveillance-broadcast (ADS-B), and enhanced vision systems (EVS).

In certain embodiments of the system 10, the controller circuit 12 and the other components of the system 10 may be integrated within or cooperate with any number and type of systems commonly deployed onboard an aircraft including, for example, an FMS 21.

The disclosed algorithm is embodied in a hardware program or software program (e.g. program 30 in controller circuit 12) and configured to communicate with the aircraft when the aircraft is in any phase of flight, including landing and takeoff.

Figure 2:
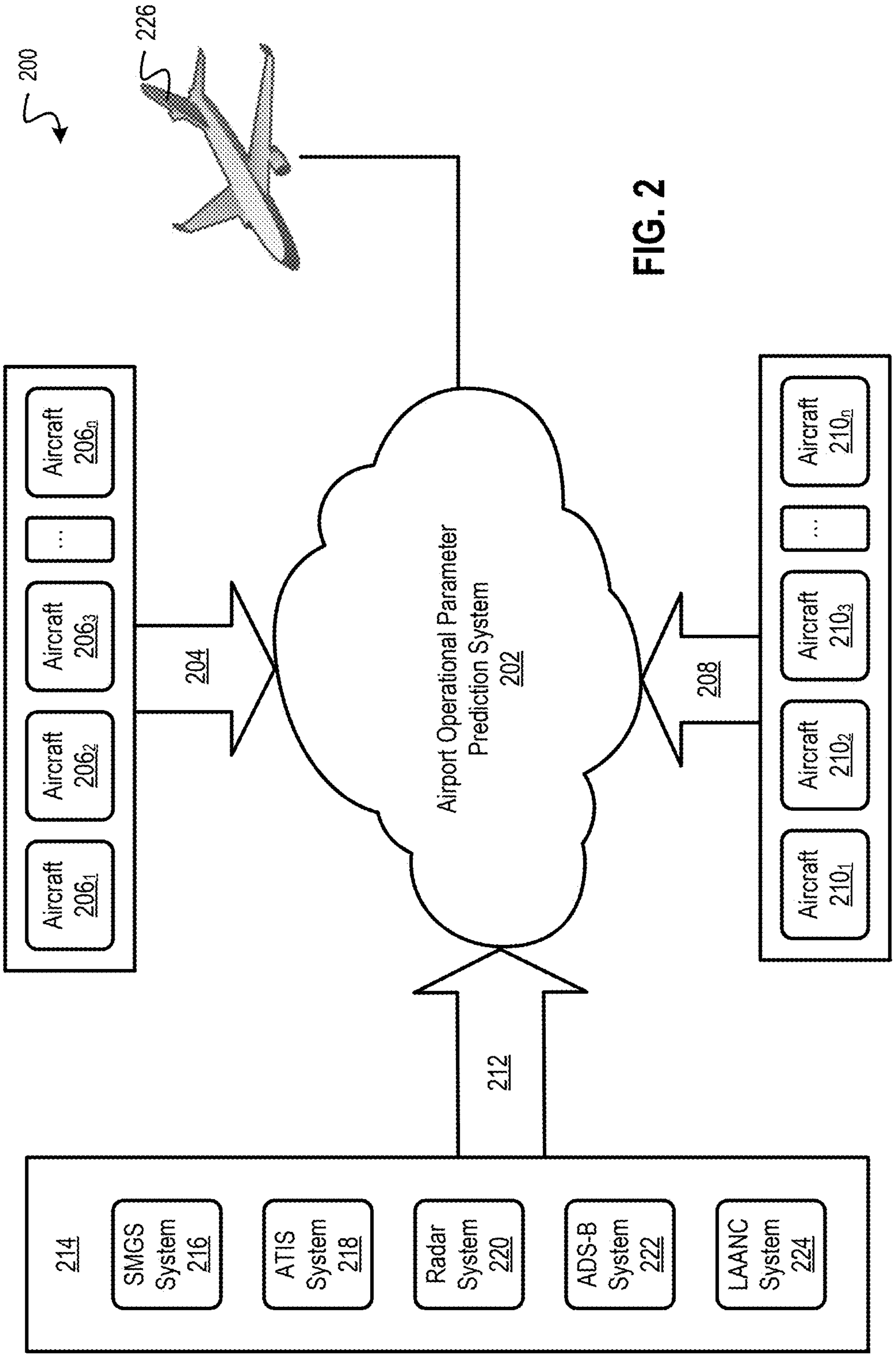
FIG. 2 is a block diagram representation of a system including an airport operational parameter prediction system in accordance with at least one embodiment.

Referring to FIG. 2, a block diagram representation of a system 200 including an airport operational parameter prediction system 202 in accordance with at least one embodiment is shown. In at least one embodiment, the airport operational parameter prediction system 202 is a cloud-based system.

The airport operational parameter prediction system 202 is configured to receive crowd-sourced controller pilot data link communication (CPDLC) messages 204 from a plurality of aircraft $206_1$-$206_n$. The plurality of aircraft $206_1$-$206_n$ are similar to the mobile platform 5 described with reference to FIG. 1. The CPDLC messages are one on one digital communications exchanged between each of the plurality of aircraft $206_1$-$206_n$ and a CPDLC system associated with an airport.

The airport operational parameter prediction system 202 is configured to receive crowd-sourced air traffic control (ATC) messages 208 from a plurality of aircraft $210_1$-$210n$. The plurality of aircraft $210_1$-$210_n$ are similar to the mobile platform 5 described with reference to FIG. 1. The ATC messages are voice communications exchanged between the plurality of aircraft $210_1$-$210_n$ and ATC at the airport via an ATC communication channel.

The CPDLC messages 204 and the ATC messages 208 include communications associated with operational parameters in connection with the aircraft $206_1$-$206_n$, $210_1$-$210_n$ landing at and taking off from the airport. The airport operational parameter prediction system 202 is configured to generate a training dataset associated with the operational parameters based on the CPDLC messages 204 and the ATC messages 208. The airport operational parameter prediction system 202 is configured to train an airport operational model associated with the airport using the training dataset based on the CPDLC messages 204 and the ATC messages 208.

In at least one embodiment, the airport operational parameter prediction system 202 is configured to receive flight data 212 from one or more flight data sources 214. In at least one embodiment, the airport operational parameter prediction system 202 is configured to receive Surface Movement Guidance Control (SMGS) data from a SMGS system 216. In at least one embodiment, the airport operational parameter prediction system 202 is configured to receive Automatic Terminal Service Information (ATIS) from an ATIS system 218. In at least one embodiment, the airport operational parameter prediction system 202 is configured to receive radar data from a radar system 220. In at least one embodiment, the airport operational parameter prediction system 202 is configured to receive Automatic Dependent Surveillance-Broadcast (ADS-B) data from an ADS-B system 222. In at least one embodiment, the airport operational parameter prediction system 202 is configured to receive Low Altitude Authorization and Notification Capability (LAANC) data from a LAANC system 224. In at least one embodiment, the airport operational parameter prediction system 202 is configured to receive flight data 212 from one or more of the SMGS system 216, the ATIS system 218, the radar system 220, the ADS-B system 222, and the LAANC system 224.

The airport operational parameter prediction system 202 is configured to generate the training dataset associated with the operational parameters based in part on the flight data 212 received from the one or more flight data sources 214. The airport operational parameter prediction system 202 is configured to train an airport operational model associated with the airport using the training dataset based on the CPDLC messages 204, the ATC messages 208, and the flight data 212.

In at least one embodiment, the airport operational parameter prediction system 202 is configured to receive a request for predicted operational parameters associated with the airport from an aircraft 226 that is preparing to land at the airport. The aircraft 226 is similar to the mobile platform 5 described with reference to FIG. 1. The airport operational parameter prediction system 202 is configured to use the trained airport operational model to generate the predicted operational parameters associated with landing at the airport and transmit the predicted operational parameters to the aircraft 226. The predicted operational parameters are displayed on a display device 14 of the aircraft 226.

In at least one embodiment, the airport operational parameter prediction system 202 is configured to receive a request for predicted operational parameters associated with the airport from an aircraft 226 that is preparing to takeoff from the airport. The airport operational parameter prediction system 202 is configured to use the trained airport operational model to generate the predicted operational parameters associated with taking off from the airport and transmit the predicted operational parameters to the aircraft 226. The predicted operational parameters are displayed on a display device 14 of the aircraft 226.

Figure 3:
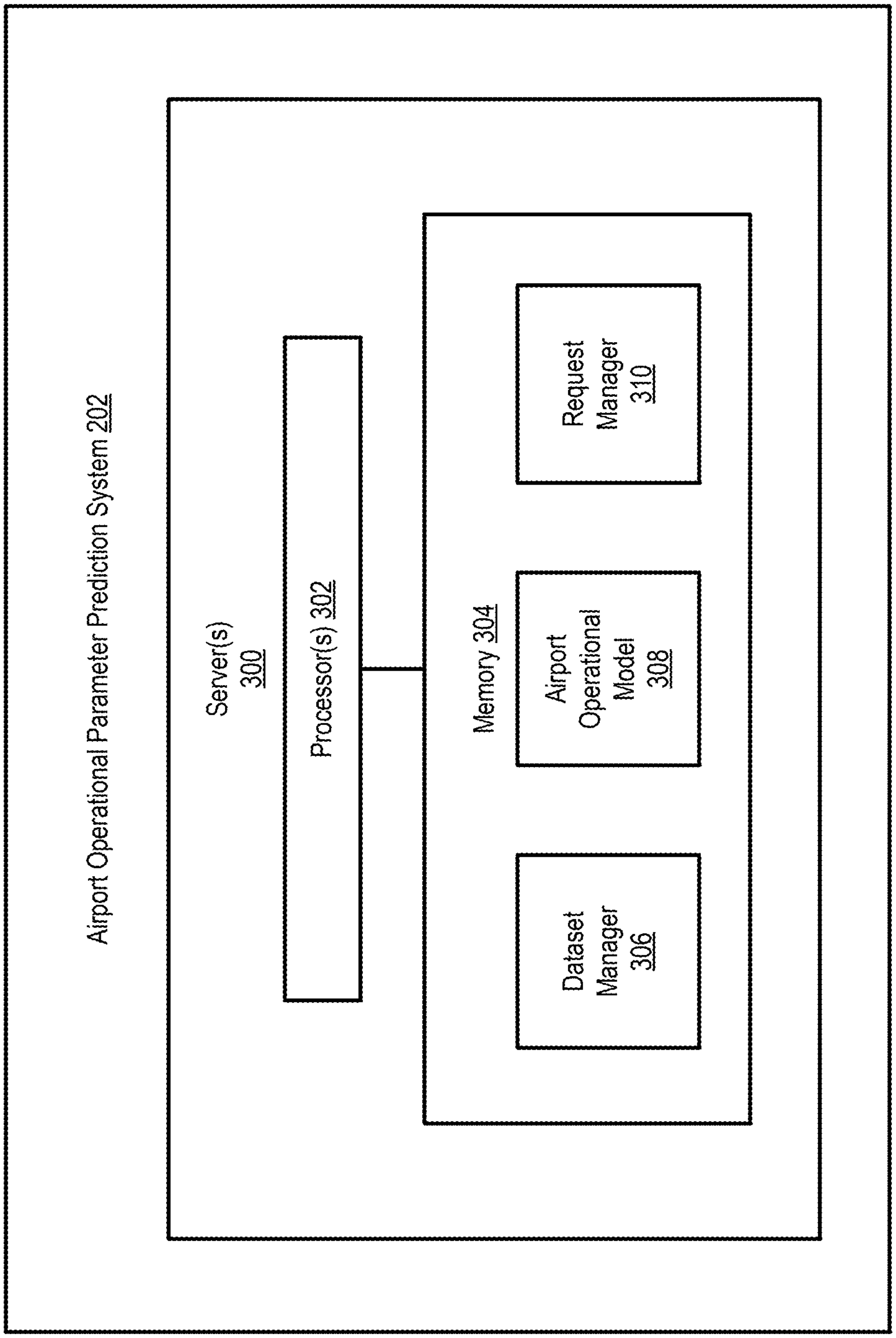
FIG. 3 is a block diagram representation of an airport operational parameter prediction system in accordance with at least one embodiment.

Referring to FIG. 3, a block diagram representation of an airport operational parameter prediction system 202 in accordance with at least one embodiment is shown. The airport operational parameter prediction system 202 includes at least one server 300. In at least one embodiment, the server(s) 300 is a component of a cloud-based system. The server(s) 300 includes at least one processor 302 and at least one memory 304. The at least one memory 304 includes a dataset manager 306, an airport operational model 308, and a request manager 310.

The dataset manager 306 is configured to receive the crowd-sourced controller CPDLC messages 204 from the plurality of aircraft $206_1$-$206_n$ and the crowd-sourced ATC messages 208 from the plurality of aircraft $210_1$-$210_n$. The dataset manager 306 is configured to generate the training dataset for the operational parameters associated with the airport based on the CPDLC messages 204 and the ATC messages 208. The dataset manager 306 is configured to train the airport operational model 306 using the training dataset based on the CPDLC messages 204 and the ATC messages 208.

In at least one embodiment, the dataset manager 306 is configured to receive the flight data 212 from the one or more flight data sources 214. The dataset manager 306 is configured to generate the training dataset for the operational parameters associated with the airport based on the CPDLC messages 204, the ATC messages 208, and the flight data 212. The dataset manager 306 is configured to train the airport operational model 306 using the training dataset based on the CPDLC messages 204, the ATC messages 208, and the flight data 212.

In at least one embodiment, the airport operational model 306 is a machine learning algorithm. In at least one embodiment, the machine learning algorithm is a deep learning algorithm. In at least one embodiment, the airport operational model is a classification algorithm.

In at least one embodiment, the request manager 310 is configured to receive the request for predicted operational parameters associated with the airport from an aircraft 226 that is preparing to land at the airport. The request manager 310 is configured to use the trained airport operational model 306 to generate the predicted operational parameters associated with landing at the airport and transmit the predicted operational parameters to the aircraft 226. The predicted operational parameters are displayed on a display device 14 of the aircraft 226.

In at least one embodiment, the request manager 310 is configured to receive a request for predicted operational parameters associated with the airport from an aircraft 226 that is preparing to takeoff from the airport. The request manager 310 is configured to use the trained airport operational model to generate the predicted operational parameters associated with taking off from the airport and transmit the predicted operational parameters to the aircraft 226. The predicted operational parameters are displayed on a display device 14 of the aircraft 226.

In various embodiments, the airport operational parameter prediction system 202 may include additional components that facilitate operation of the airport operational parameter prediction system 202.

Figure 4:
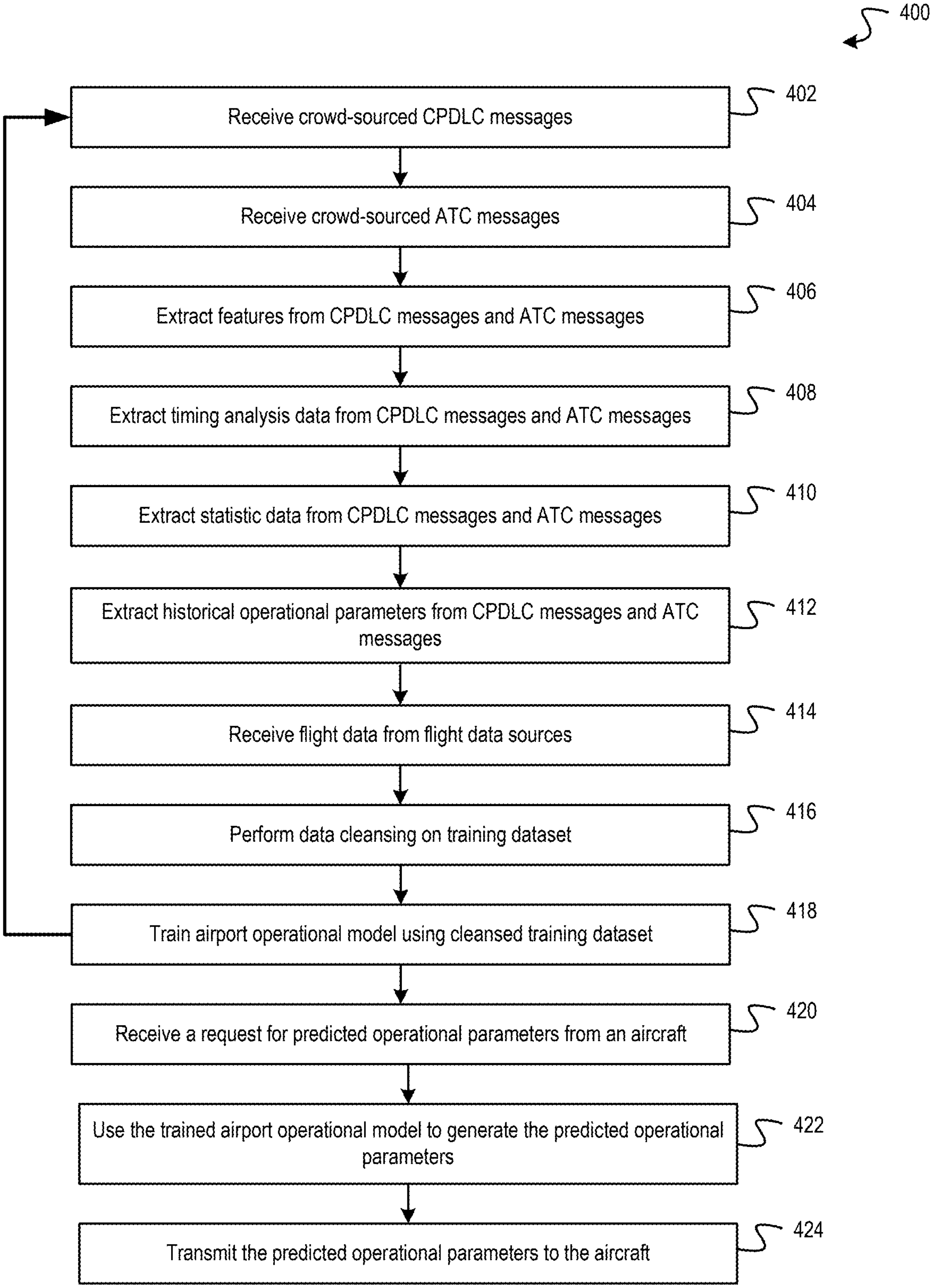
FIG. 4 is a flowchart representation of a method for predicting operational parameters associated with an airport in accordance with at least one embodiment.

Referring to FIG. 4, a flowchart representation of a method 400 for predicting operational parameters associated with an airport in accordance with at least one embodiment is shown. The method 400 will be described with reference to an exemplary implementation of an airport operational parameter prediction system 202. As can be appreciated in light of the disclosure, the order of operation within the method 400 is not limited to the sequential execution as illustrated in FIG. 4 but may be performed in one or more varying orders as applicable and in accordance with the present disclosure.

At 402, the airport operational parameter prediction system 202 receives crowd-sourced CPDLC messages 204 from a plurality of aircraft $206_1$-$206_n$. The crowd-sourced CPDLC messages 204 are associated with the plurality of aircraft $206_1$-$206_n$ that have engaged in a landing or a takeoff at the airport. In at least one embodiment, the airport operational parameter prediction system 202 receives the crowd-sourced CPDLC messages 204 in real time as they are exchanged between each of the plurality of aircraft $206_1$-$206_n$ and a CPDLC system.

At 404, the airport operational parameter prediction system 202 receives crowd-sourced ATC messages 208 from a plurality of aircraft $210_1$-$210_n$. The crowd-sourced ATC messages 208 are associated with the plurality of aircraft $210_1$-$210_n$ that have engaged in a landing or a takeoff at the airport. In at least one embodiment, the airport operational parameter prediction system 202 receives the crowd-sourced ATC messages 208 in real time as they are exchanged between each of the plurality of aircraft $210_1$-$210_n$ and ATC. In at least one embodiment, the airport operational parameter prediction system 202 transcribes the ATC messages 208 and used the transcribed ATC messages 208 to generate the training dataset based on the ATC messages 208.

At 406, the airport operational parameter prediction system 202 extracts features associated with operational parameters from the CPDLC messages 204 and the ATC messages 208. Examples of the extracted features include, but are not limited to, flight phases, runway identifiers of runways at the airport, taxiway identifiers of taxiways at the airport, and pathway identifiers for pathways to airport gates at the airport. In at least one embodiment, the airport operational parameter prediction system 202 includes the extracted features in the training dataset. In at least one embodiment, the airport operational parameter prediction system 202 identifies correlations between the extracted features to identify a subset of the extracted features to include in the training dataset.

At 408, the airport operational parameter prediction system 202 extracts timing analysis data associated with operational parameters from the CPLDC messages 204 and the ATC messages 208. The airport operational parameter prediction system 202 includes the extracted timing analysis data in the training dataset. Examples of the timing analysis data include, but are not limited to, time to transition from a first flight phase to a second flight phase, time from approach to landing, time from landing to taxiing, time from taxiing to airport gate, time from airport gate to taxiing, time from taxiing to takeoff, time from takeoff to cruise, and time in holding pattern.

At 410, the airport operational parameter prediction system 202 extracts statistical data associated with the operational parameters from the CPLDC messages 204 and the ATC messages 208. The airport operational parameter prediction system 202 includes the extracted statistical data in the training dataset. Examples of the statistical data include, but are not limited to, a number of aircraft at an airport gate, a number of aircraft taxiing, a number of aircraft waiting for a runway, a number of aircraft waiting for takeoff, and a number of aircraft in a holding pattern.

At 412, the airport operational parameter prediction system 202 extracts historical operational parameters from the CPDLC messages 204 and the ATC messages 208. The airport operational parameter prediction system 202 includes the extracted historical operational parameters in the training dataset. In at least one embodiment, the airport operational model 308 employs predictive analytics to based on the historical operational parameters to generate the predicted operational parameters.

At 414, the airport operational parameter prediction system 202 receives flight data 212 from one or more flight data sources 214. Examples of flight data sources include, but are not limited to, an SMGS system 216, an ATIS system 218, a radar system 220, an ADS-B system 222, and a LAANC system 224. The airport operational parameter prediction system 202 includes the flight data in the training dataset.

At 416, the airport operational parameter prediction system 202 performs data cleansing on the training dataset to generate a cleansed training dataset. At 418, the airport operational parameter prediction system 202 uses the cleansed training dataset to train the airport operational model 308.

The steps 402 through 418 are repeated on a continuous basis and performed in real time as new CPDCL messages 204 and new ATC messages 208 are received from the aircraft $206_1$-$206_n$, $210_1$-$210_n$ as the aircraft $206_1$-$206_n$, $210_1$-$210_n$ land at and takeoff from the airport. The new CPDCL messages 204 and new ATC messages 208 are used to update the training dataset and the updated training dataset is used to update and/or refine the airport operational model 308.

At 420, a request for predicted operational parameters associated with the airport is received from an aircraft 226. In at least one embodiment, the airport operational parameter prediction system 202 receives the request for predicted operational parameters from an aircraft 226 that is preparing to land at the airport. In at least one embodiment, the airport operational parameter prediction system 202 receives the request for predicted operational parameters from an aircraft 226 that is preparing to takeoff from the airport.

At 422, the airport operational parameter prediction system 202 uses the trained airport operational model 308 to generate the predicted operational parameters in accordance with the received request. At 424, the airport operational parameter prediction system 202 transmits the predicted operational parameters to the aircraft 226. The predicted operational parameters are displayed on a display device 14 of the aircraft 226.

Referring to FIG. 5, an exemplary illustration a display 500 displayed on a display device 14 onboard the aircraft 226 including predicted operational parameters associated with a landing flight phase generated by an airport operational parameter prediction system 202 in accordance with at least one embodiment is shown.

The airport operational parameter prediction system 202 received crowd-sourced CPDLC messages 204 from a plurality of aircraft $206_1$-$206_n$. The crowd-sourced CPDLC messages 204 were associated with the plurality of aircraft $206_1$-$206_n$ that were previously engaged in landing at an airport. The airport operational parameter prediction system 202 received the crowd-sourced CPDLC messages 204 in real time as they were exchanged between each of the plurality of aircraft $206_1$-$206_n$ and a CPDLC system.

The airport operational parameter prediction system 202 received crowd-sourced ATC messages 208 from a plurality of aircraft $210_1$-$210_n$. The crowd-sourced ATC messages 208 were associated with the plurality of aircraft $210_1$-$210_n$ that were previously engaged in landing at the airport. The airport operational parameter prediction system 202 received the crowd-sourced ATC messages 208 in real time as they were exchanged between each of the plurality of aircraft $210_1$-$210_n$ and ATC. The airport operational parameter prediction system 202 transcribed the ATC messages 208 and used the transcribed ATC messages 208 to generate the training dataset based on the ATC messages 208.

The airport operational parameter prediction system 202 extracted features associated with operational parameters associated with landing at the airport from the CPDLC messages 204 and the ATC messages 208. Examples of the extracted features include, but are not limited to, runway identifiers of runways at the airport, taxiway identifiers of taxiways at the airport, and pathway identifiers for pathways to airport gates at the airport. The airport operational parameter prediction system 202 identified correlations between the extracted features to identify a subset of the extracted features to include in the training dataset.

The airport operational parameter prediction system 202 extracted timing analysis data associated with operational parameters associated with landing at the airport from the CPLDC messages 204 and the ATC messages 208. The airport operational parameter prediction system 202 included the extracted timing analysis data in the training dataset. Examples of the timing analysis data include, but are not limited to, time to transition from a first flight phase to a second flight phase, time from approach to landing, time from landing to taxiing, time from taxiing to airport gate, and time in holding pattern.

The airport operational parameter prediction system 202 extracted statistical data associated with the operational parameters from the CPLDC messages 204 and the ATC messages 208. The airport operational parameter prediction system 202 included the extracted statistical data in the training dataset. Examples of the statistical data include, but are not limited to, a number of aircraft at an airport gate, a number of aircraft taxiing, and a number of aircraft in a holding pattern.

The airport operational parameter prediction system 202 extracted historical operational parameters from the CPDLC messages 204 and the ATC messages 208. The airport operational parameter prediction system 202 included the extracted historical operational parameters in the training dataset. The airport operational model 308 employed predictive analytics based on the historical operational parameters to generate the predicted operational parameters.

The airport operational parameter prediction system 202 received flight data 212 from flight data sources 214. The airport operational parameter prediction system 202 received SMGS data from an SMGS system 216. The airport operational parameter prediction system 202 received ATIS data from an ATIS system 218. The airport operational parameter prediction system 202 received radar data from a radar system 220. The airport operational parameter prediction system 202 received ADS-B data from an ADS-B system 222. The airport operational parameter prediction system 202 received LAANC data from a LAANC system 224.

The airport operational parameter prediction system 202 included the SMGS data in the training dataset. The airport operational parameter prediction system 202 included the ATIS data in the training dataset. The airport operational parameter prediction system 202 included the radar data in the training dataset. The airport operational parameter prediction system 202 included the ADS-B data in the training dataset. The airport operational parameter prediction system 202 included the LAANC data in the training dataset.

The airport operational parameter prediction system 202 performed data cleansing on the training dataset to generate a cleansed training dataset. The airport operational parameter prediction system 202 used the cleansed training dataset to train the airport operational model 308.

The airport operational parameter prediction system 202 received a request for predicted operational parameters associated with the airport from an aircraft 226 that is preparing to land at the airport. The airport operational parameter prediction system 202 used the trained airport operational model 308 to generate the predicted operational parameters in accordance with the received request. The airport operational parameter prediction system 202 transmitted the predicted operational parameters to the aircraft 226. The predicted operational parameters were displayed on the display 500 on a display device 14 of the aircraft 226.

The display 500 includes an airport identifier field 502. The airport identifier field 502 is used to display an airport identifier of an airport. For example, the airport identifier displayed in the airport identifier field 502 of the display 500 is DeerValley (KDVT).

The display 500 includes a landing statistic status field 504. The landing statistics status field 504 is used to display a status of the landing statistics. For example, the status of the landing statistics displayed in the landing statistics field 504 is "current."

The display 500 includes a predicted operational parameter table 506. The predicted operational parameter table 506 includes a row of "Cleared To" field labels. The "Cleared To" field labels in the display 500 include "Cleared To" field labels associated with a landing phase of an aircraft.

The first "Cleared To" field label in the predicted operational parameter table 506 is a "Hold" field label. The predicted operational parameters associated with the "Hold" field label includes a number of aircraft and an average time. For example, the predicted operational parameter associated with the "Hold" field label in the display 500 is two aircraft for the number of aircraft and eight seconds for the average time.

The second "Cleared To" field label in the predicted operational parameter table 506 is a "Long Final" field label. The predicted operational parameters associated with the "Long Final" field label includes a number of aircraft and an average time. For example, the predicted operational parameter associated with the "Long Final" field label in the display 500 is five aircraft for the number of aircraft and five minutes for the average time.

The third "Cleared To" field label in the predicted operational parameter table 506 is a "Final" field label. The predicted operational parameters associated with the "Final" field label includes a number of aircraft and an average time. For example, the predicted operational parameter associated with the "Final" field label in the display 500 is three aircraft for the number of aircraft. There is no average time specified for this predicted operational parameter.

The fourth "Cleared To" field label in the predicted operational parameter table 506 is a "Short Final" field label. The predicted operational parameters associated with the "Short Final" field label includes a number of aircraft and an average time. For example, the predicted operational parameter associated with the "Short Final" field label in the display 500 is three aircraft for the number of aircraft. There is no average time specified for this predicted operational parameter.

The fifth "Cleared To" field label in the predicted operational parameter table 506 is a "Land" field label. The predicted operational parameters associated with the "Land" field label includes a number of aircraft and an average time. For example, the predicted operational parameter associated with the "Land" field label in the display 500 is two aircraft for the number of aircraft and three minutes for the average time.

The sixth "Cleared To" field label in the predicted operational parameter table 506 is a "Go Around" field label. The predicted operational parameters associated with the "Go Around" field label includes a number of aircraft and an average time. For example, the predicted operational parameter associated with the "Go Around" field label in the display 500 is one aircraft for the number of aircraft and one minute and forty-three seconds for the average time.

The seventh "Cleared To" field label in the predicted operational parameter table 506 is a "Total" field label. The predicted operational parameters associated with the "Total" field label includes a number of aircraft. For example, the predicted operational parameter associated with the "Total" field label in the display 500 is fifteen aircraft.

The display 500 includes a notes field 508. The notes field 508 includes predicted operations parameters in the form of notes. A first note in the notes field 508 indicates a predicted taxiway for a runway. The predicted taxiway in this example is Charlie 07. The runway in this example is RWY 07R. A second note in the notes field 508 includes a predicted number of aircraft on a runway. The prediction in the example is for RNAV RWY 25L. The predicted number of aircraft on the RNAV RWY 25L is three aircraft. A third note in the notes field 508 includes a predicted number of aircraft on a runway. The prediction in the example is for RNAV RWY 7R. The predicted number of aircraft on the RNAV RWY 7R is three aircraft.

The display 500 includes "When you arrive" section 510. The "When you arrive" section 510 is a summary of a plurality of predicted operational parameters that are provided as important predicted operational parameters to bring to the attention of a pilot. In this example, the "When you arrive" section 510 includes five entries in the summary of the plurality of predicted operational parameters that are provided as important predicted operational parameters to bring to the attention of the pilot.

The first entry in the "When you arrive" section 510 is a predicted operational parameter of a total number of aircraft that are predicted to arrive at the airport over the next one hour. The total number of aircraft that are predicted to arrive at the airport over the next one hour is fifteen aircraft.

The second entry in the "When you arrive" section 510 is a predicted operational parameter of a total number of aircraft that are predicted to be on a particular runway. The runway in this entry is RNAV RWY 25L. The total number of aircraft that are predicted to be on the runway RNAV RWY 25L is five aircraft.

The third entry in the "When you arrive" section 510 is a predicted operational parameter of a total number of aircraft that are predicted to be on a particular runway. The runway in this entry is RNAV RWY 7R. The total number of aircraft that are predicted to be on the runway RNAV RWY 7R is three aircraft.

The fourth entry in the "When you arrive" section 510 is a predicted operational parameter of a predicted time associated with an expected clearance to land. The predicted operational parameter of the predicted time associated with the expected clearance to land in the example is five minutes.

The fifth entry in the "When you arrive" section 510 is a predicted operational parameter of a predicted time associated with an expected taxiway clearance. The predicted operational parameter of the predicted time associated with the expected taxiway clearance in the example is one minute.

Figure 6:
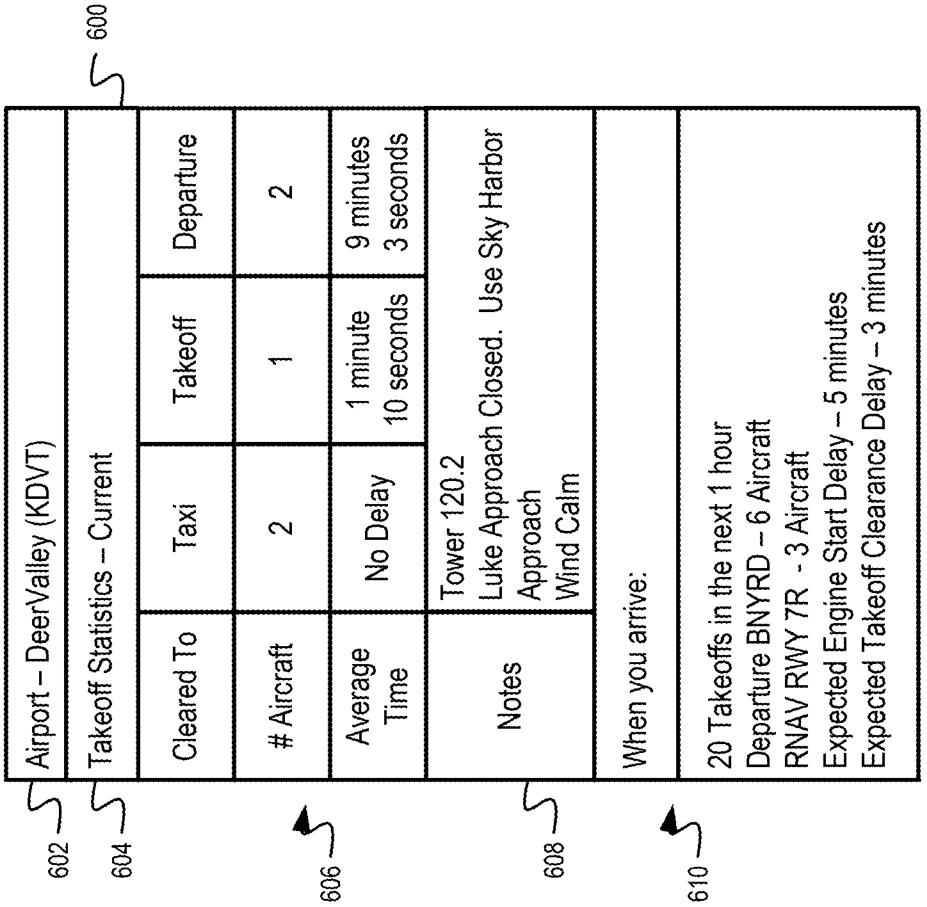
FIG. 6 is an exemplary illustration of a display including predicted operational parameters associated with a takeoff flight phase generated by an airport operational parameter prediction system in accordance with at least one embodiment.

Referring to FIG. 6, an exemplary illustration of a display 600 displayed on a display device 14 onboard the aircraft 226 including predicted operational parameters associated with a takeoff flight phase generated by an airport operational parameter prediction system 202 in accordance with at least one embodiment is shown. The predicted operational parameters were generated by the airport operational parameter prediction system 202 in response to a request from an aircraft 226 preparing to takeoff from the airport.

The airport operational parameter prediction system 202 received crowd-sourced CPDLC messages 204 from a plurality of aircraft $206_1$-$206_n$. The crowd-sourced CPDLC messages 204 were associated with the plurality of aircraft $206_1$-$206_n$ that were previously engaged in taking off from an airport. The airport operational parameter prediction system 202 received the crowd-sourced CPDLC messages 204 in real time as they were exchanged between each of the plurality of aircraft $206_1$-$206_n$ and a CPDLC system.

The airport operational parameter prediction system 202 received crowd-sourced ATC messages 208 from a plurality of aircraft $210_1$-$210_n$. The crowd-sourced ATC messages 208 were associated with the plurality of aircraft $210_1$-$210_n$ that were previously engaged in taking off from the airport. The airport operational parameter prediction system 202 received the crowd-sourced ATC messages 208 in real time as they were exchanged between each of the plurality of aircraft $210_1$-$210_n$ and ATC. The airport operational parameter prediction system 202 transcribed the ATC messages 208 and used the transcribed ATC messages 208 to generate the training dataset based on the ATC messages 208.

The airport operational parameter prediction system 202 extracted features associated with operational parameters associated with taking off from the airport from the CPDLC messages 204 and the ATC messages 208. Examples of the extracted features include, but are not limited to, runway identifiers of runways at the airport, taxiway identifiers of taxiways at the airport, and pathway identifiers for pathways from airport gates at the airport. The airport operational parameter prediction system 202 identified correlations between the extracted features to identify a subset of the extracted features to include in the training dataset.

The airport operational parameter prediction system 202 extracted timing analysis data associated with operational parameters associated with taking off from the airport from the CPLDC messages 204 and the ATC messages 208. The airport operational parameter prediction system 202 included the extracted timing analysis data in the training dataset. Examples of the timing analysis data include, but are not limited to, time to transition from a first flight phase to a second flight phase, time from airport gate to taxiing, time from taxiing to takeoff, and time from takeoff to cruise.

The airport operational parameter prediction system 202 extracted statistical data associated with the operational parameters from the CPLDC messages 204 and the ATC messages 208. The airport operational parameter prediction system 202 included the extracted statistical data in the training dataset The airport operational parameter prediction system 202 extracted historical operational parameters from the CPDLC messages 204 and the ATC messages 208. The airport operational parameter prediction system 202 included the extracted historical operational parameters in the training dataset. The airport operational model 308 employed predictive analytics based on the historical operational parameters to generate the predicted operational parameters.

The airport operational parameter prediction system 202 received flight data 212 from flight data sources 214. The airport operational parameter prediction system 202 received SMGS data from an SMGS system 216. The airport operational parameter prediction system 202 received ATIS data from an ATIS system 218. The airport operational parameter prediction system 202 received radar data from a radar system 220. The airport operational parameter prediction system 202 received ADS-B data from an ADS-B system 222. The airport operational parameter prediction system 202 received LAANC data from a LAANC system 224.

The airport operational parameter prediction system 202 included the SMGS data in the training dataset. The airport operational parameter prediction system 202 included the ATIS data in the training dataset. The airport operational parameter prediction system 202 included the radar data in the training dataset. The airport operational parameter prediction system 202 included the ADS-B data in the training dataset. The airport operational parameter prediction system 202 included the LAANC data in the training dataset.

The airport operational parameter prediction system 202 performed data cleansing on the training dataset to generate a cleansed training dataset. The airport operational parameter prediction system 202 used the cleansed training dataset to train the airport operational model 308.

The airport operational parameter prediction system 202 received a request for predicted operational parameters associated with the airport from an aircraft 226 that is preparing to takeoff from the airport. The airport operational parameter prediction system 202 used the trained airport operational model 308 to generate the predicted operational parameters in accordance with the received request. The airport operational parameter prediction system 202 transmitted the predicted operational parameters to the aircraft 226. The predicted operational parameters were displayed on the display 600 on a display device 14 of the aircraft 226.

The display 600 includes an airport identifier field 602. The airport identifier field 602 is used to display an airport identifier of an airport. For example, the airport identifier displayed in the airport identifier field 602 of the display 600 is DeerValley (KDVT).

The display 600 includes a takeoff statistic status field 604. The landing statistics status field 604 is used to display a status of the takeoff statistics. For example, the status of the takeoff statistics displayed in the takeoff statistics field 604 is "current."

The display 600 includes a predicted operational parameter table 606. The predicted operational parameter table 606 includes a row of "Cleared To" field labels. The "Cleared To" field labels in the display 600 include "Cleared To" field labels associated with a takeoff phase of an aircraft.

The first "Cleared To" field label in the predicted operational parameter table 606 is a "Taxi" field label. The predicted operational parameters associated with the "Taxi" field label includes a number of aircraft and an average time. For example, the predicted operational parameter associated with the "Taxi" field label in the display 600 is two aircraft for the number of aircraft and the average time is shown as no delay.

The second "Cleared To" field label in the predicted operational parameter table 606 is a "Takeoff" field label. The predicted operational parameters associated with the "Takeoff" field label includes a number of aircraft and an average time. For example, the predicted operational parameter associated with the "Takeoff" field label in the display 600 is one aircraft for the number of aircraft and one minute and ten seconds for the average time.

The third "Cleared To" field label in the predicted operational parameter table 606 is a "Departure" field label. The predicted operational parameters associated with the "Departure" field label includes a number of aircraft and an average time. For example, the predicted operational parameter associated with the "Departure" field label in the display 600 is two aircraft for the number of aircraft and nine minutes and three seconds for the average time.

The display 600 includes a notes field 608. The notes field 608 includes predicted operations parameters in the form of notes. A first note in the notes field 608 indicates a Tower 120.2. A second note in the notes field 608 indicates that the Luke Approach is expected to be closed and to use the Sky Harbor Approach. A third note in the notes field 608 indicates that the wind is predicted to be calm.

The display 600 includes "When you arrive" section 610. The "When you arrive" section 610 is a summary of a plurality of predicted operational parameters that are provided as important predicted operational parameters to bring to the attention of a pilot. In this example, the "When you arrive" section 610 includes five entries in the summary of the plurality of predicted operational parameters that are provided as important predicted operational parameters to bring to the attention of the pilot.

The first entry in the "When you arrive" section 610 is a predicted operational parameter of a total number of aircraft that are predicted to takeoff from the airport over the next one hour. The total number of aircraft that are predicted to take off from the airport over the next one hour is twenty aircraft.

The second entry in the "When you arrive" section 610 is a predicted operational parameter of a total number of aircraft that are expected to depart from the airport. The total number of aircraft that are predicted to depart from the airport is six aircraft.

The third entry in the "When you arrive" section 610 is a predicted operational parameter of a total number of aircraft that are predicted to be on a particular runway. The runway in this entry is RNAV RWY 7R. The total number of aircraft that are predicted to be on the runway RNAV RWY 7R is three aircraft.

The fourth entry in the "When you arrive" section 610 is a predicted operational parameter of a predicted time associated with an expected engine start delay. The predicted operational parameter of the predicted time associated with the expected engine start delay in the example is five minutes.

The fifth entry in the "When you arrive" section 610 is a predicted operational parameter of a predicted time associated with an expected takeoff clearance delay. The predicted operational parameter of the predicted time associated with the expected takeoff clearance delay in the example is three minutes.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for generating predicted operational parameters associated with an airport comprising:

at least one processor; and at least one memory communicatively coupled to the at least one processor, the at least one memory comprising instructions that upon execution by the at least one processor, cause the at least one processor to:

receive controller pilot data link communication (CPDLC) messages exchanged between a CPDLC system and a first plurality of aircraft at the airport;

receive air traffic control (ATC) messages exchanged between ATC and a second plurality of aircraft at the airport;

generate a training dataset associated with at least one operational parameter by aggregating the CPDLC messages and the ATC messages;

extract features associated with the at least one operational parameter from the CPLDC messages and the ATC messages, wherein the extracted features comprise at least one of flight phases, runway identifiers, taxiway identifiers, and pathway identifiers for pathways to airport gates;

train an airport operational model associated with the airport using the training dataset, wherein the training dataset comprises a subset of the extracted features;

receive a request for at least one predicted operational parameter associated with the airport from a first aircraft;

generate the at least one predicted operational parameter using the trained airport operational model, the at least one predicted operational parameter corresponding to one of the at least one operational parameter; and transmit the at least one predicted operational parameter to the first aircraft.

2. The system of claim 1, wherein, the at least one memory further comprises instructions that upon execution by the at least one processor, cause the at least one processor to:

perform data cleansing on the training dataset to generate a cleansed training dataset; and use the cleansed training dataset to train the airport operational model.

3. The system of claim 1, wherein the airport operational model comprises one of a machine learning algorithm, a deep learning algorithm, and a classification algorithm.

4. The system of claim 1, wherein:

the training dataset associated with the at least one operational parameter further comprises historical operational parameters retrieved from the CPDLC messages and the ATC messages; and the airport operational model employs predictive analytics based on the historical operational parameters to generate the at least one predicted operational parameter.

5. The system of claim 1, wherein the at least one memory further comprises instructions that upon execution by the at least one processor, cause the at least one processor to:

receive flight data from at least one flight data source, the flight data comprising at least one of Surface Movement Guidance Control (SMGS) data from a SMGS system, Automatic Terminal Service Information (ATIS) from an ATIS system, radar data from an airport radar system, Automatic Dependent Surveillance-Broadcast (ADS-B) data from an ADS-B system, and Low Altitude Authorization and Notification Capability (LAANC) data from a LAANC system; and train the airport operational model using the training dataset, wherein the training dataset comprises the flight data.

6. The system of claim 1, wherein the at least one memory further comprises instructions that upon execution by the at least one processor, cause the at least one processor to:

extract timing analysis data associated with the at least one operational parameter from the CPLDC messages and the ATC messages, wherein the timing analysis data comprises at least one of time to transition from a first flight phase to a second flight phase, time from approach to landing, time from landing to taxiing, time from taxiing to airport gate, time from airport gate to taxiing, time from taxiing to takeoff, time from takeoff to cruise, and time in holding pattern; and train the airport operational model using the training dataset, wherein the training dataset comprises the timing analysis data.

7. The system of claim 1, wherein the at least one memory further comprises instructions that upon execution by the at least one processor, cause the at least one processor to:

extract statistical data associated with the at least one operational parameter from the CPLDC messages and the ATC messages, wherein the statistical data comprises at least one of a number of aircraft at an airport gate, a number of aircraft taxiing, a number of aircraft waiting for a runway, a number of aircraft waiting for takeoff, and a number of aircraft in a holding pattern; and train the airport operational model using the training dataset, wherein the training dataset comprises the statistical data.

8. A method for generating predicted operational parameters associated with an airport comprising:

receiving controller pilot data link communication (CPDLC) messages exchanged between a CPDLC system and a first plurality of aircraft at an airport;

receiving air traffic control (ATC) messages exchanged between ATC and a second plurality of aircraft at the airport;

generating a training dataset associated with at least one operational parameter by aggregating the CPDLC messages and the ATC messages;

extracting features associated with the at least one operational parameter from the CPLDC messages and the ATC messages, wherein the extracted features comprise at least one of flight phases, runway identifiers, taxiway identifiers, and pathway identifiers for pathways to airport gates;

training an airport operational model associated with the airport using the training dataset, wherein the training dataset comprises a subset of the extracted features;

receiving a request for at least one predicted operational parameter associated with the airport from a first aircraft;

generating the at least one predicted operational parameter using the trained airport operational model, the at least one predicted operational parameter corresponding to one of the at least one operational parameter; and transmitting the at least one predicted operational parameter to the first aircraft.

9. The method of claim 8, further comprising:

performing data cleansing on the training dataset to generate a cleansed training dataset; and using the cleansed training dataset to train the airport operational model.

10. The method of claim 8, wherein the airport operational model comprises one of a machine learning algorithm, a deep learning algorithm, and a classification algorithm.

11. The method of claim 8, wherein:

the training dataset associated with the at least one operational parameter further comprises historical operational parameters retrieved from the CPDLC messages and the ATC messages; and the airport operational model employs predictive analytics based on the historical operational parameters to generate the at least one predicted operational parameter.

12. The method of claim 8, further comprising:

receiving flight data from at least one flight data source, the flight data comprising at least one of Surface Movement Guidance Control (SMGS) data from a SMGS system, Automatic Terminal Service Information (ATIS) from an ATIS system, radar data from an airport radar system, Automatic Dependent Surveillance-Broadcast (ADS-B) data from an ADS-B system, and Low Altitude Authorization and Notification Capability (LAANC) data from a LAANC system; and training the airport operational model using the training dataset, wherein the training dataset comprises the flight data.

13. The method of claim 8, further comprising:

extracting timing analysis data associated with the at least one operational parameter from the CPLDC messages and the ATC messages, wherein the timing analysis data comprises at least one of time to transition from a first flight phase to a second flight phase, time from approach to landing, time from landing to taxiing, time from taxiing to airport gate, time from airport gate to taxiing, time from taxiing to takeoff, time from takeoff to cruise, and time in holding pattern; and training the airport operational model using the training dataset, wherein the training dataset comprises the timing analysis data.

14. The method of claim 8, further comprising:

extracting statistical data associated with the at least one operational parameter from the CPLDC messages and the ATC messages, wherein the statistical data comprises at least one of a number of aircraft at an airport gate, a number of aircraft taxiing, a number of aircraft waiting for a runway, a number of aircraft waiting for takeoff, and a number of aircraft in a holding pattern; and training the airport operational model using the training dataset, wherein the training dataset comprises the statistical data.

15. At least one non-transitory machine-readable storage medium that stores instructions executable by at least one processor, the instructions configurable to cause the at least one processor to perform operations comprising:

receiving controller pilot data link communication (CPDLC) messages exchanged between a CPDLC system and a first plurality of aircraft at an airport;

receiving air traffic control (ATC) messages exchanged between ATC and a second plurality of aircraft at the airport;

generating a training dataset associated with at least one operational parameter by aggregating the CPDLC messages and the ATC messages;

extracting features associated with the at least one operational parameter from the CPLDC messages and the ATC messages, wherein the extracted features comprise at least one of flight phases, runway identifiers, taxiway identifiers, and pathway identifiers for pathways to airport gates;

training an airport operational model associated with the airport using the training dataset, wherein the training dataset comprises a subset of the extracted features;

receiving a request for at least one predicted operational parameter associated with the airport from a first aircraft;

generating the at least one predicted operational parameter using the trained airport operational model, the at least one predicted operational parameter corresponding to one of the at least one operational parameter; and transmitting the at least one predicted operational parameter to the first aircraft.

16. The at least one non-transitory machine-readable storage medium of claim 15, further storing instructions executable by at least one processor, to cause the at least one processor to perform operations comprising:

receiving flight data from at least one flight data source, the flight data comprising at least one of Surface Movement Guidance Control (SMGS) data from a SMGS system, Automatic Terminal Service Information (ATIS) from an ATIS system, radar data from an airport radar system, Automatic Dependent Surveillance-Broadcast (ADS-B) data from an ADS-B system, and Low Altitude Authorization and Notification Capability (LAANC) data from a LAANC system; and training the airport operational model using the training dataset, wherein the training dataset comprises the flight data.

17. The at least one non-transitory machine-readable storage medium of claim 15, further storing instructions executable by at least one processor, to cause the at least one processor to perform operations comprising:

performing data cleansing on the training dataset to generate a cleansed training dataset; and using the cleansed training dataset to train the airport operational model.

* * * * *